US012029218B2

(12) United States Patent
Bui et al.

(10) Patent No.: US 12,029,218 B2
(45) Date of Patent: Jul. 9, 2024

(54) PERACETIC ACID STABILIZED COMPOSITIONS WITH STABLE LINING

(71) Applicant: Medivators Inc., Minneapolis, MN (US)

(72) Inventors: Huyen Bui, Brooklyn Park, MN (US); John Matta, Shoreview, MN (US); Kristopher Murphy, New Brighton, MN (US); Tuan Nguyen, Chaska, MN (US); Jonathan K. Olson, Delano, MN (US); Mason Schwartz, Elk River, MN (US); Rudley R. Rau, Rice, MN (US)

(73) Assignee: Medivators Inc., Minneapolis, MN (US)

( * ) Notice: Subject to any disclaimer, the term of this patent is extended or adjusted under 35 U.S.C. 154(b) by 758 days.

(21) Appl. No.: 17/278,756

(22) PCT Filed: Sep. 26, 2019

(86) PCT No.: PCT/US2019/053091
§ 371 (c)(1),
(2) Date: Mar. 23, 2021

(87) PCT Pub. No.: WO2020/069079
PCT Pub. Date: Apr. 2, 2020

(65) Prior Publication Data
US 2022/0030871 A1 Feb. 3, 2022

Related U.S. Application Data

(60) Provisional application No. 62/737,475, filed on Sep. 27, 2018.

(51) Int. Cl.
| | | |
|---|---|---|
| A01N 59/00 | (2006.01) | |
| A01N 25/22 | (2006.01) | |
| A01N 37/16 | (2006.01) | |
| A01P 1/00 | (2006.01) | |
| B65D 25/14 | (2006.01) | |
| B65D 81/24 | (2006.01) | |

(52) U.S. Cl.
CPC ............ *A01N 59/00* (2013.01); *A01N 25/22* (2013.01); *A01N 37/16* (2013.01); *A01P 1/00* (2021.08); *B65D 25/14* (2013.01); *B65D 81/24* (2013.01)

(58) Field of Classification Search
None
See application file for complete search history.

(56) References Cited

U.S. PATENT DOCUMENTS

| | | | |
|---|---|---|---|
| 2,910,504 | A | 10/1959 | Hawkinson et al. |
| 3,962,396 | A | 6/1976 | Ono et al. |
| 5,056,689 | A | 10/1991 | Heyl et al. |
| 5,296,239 | A | 3/1994 | Colery et al. |
| 5,508,046 | A | 4/1996 | Cosentino et al. |
| 5,616,335 | A | 4/1997 | Nicolle et al. |
| 5,980,776 | A | 11/1999 | Zakikhani et al. |
| 6,071,434 | A | 6/2000 | Davis et al. |
| 7,547,421 | B2 | 6/2009 | Mcsherry et al. |
| 8,277,733 | B2 | 10/2012 | Mcsherry et al. |
| 8,568,613 | B2 | 10/2013 | Man et al. |
| 10,010,081 | B2 | 7/2018 | Karageozian |
| 10,307,498 | B2 | 6/2019 | Franciskovich et al. |
| 10,858,249 | B2 | 12/2020 | Ahmadpour |
| 2009/0074881 | A1 | 3/2009 | Kielbania, Jr. |
| 2010/0120913 | A1 | 5/2010 | Larson et al. |
| 2014/0328941 | A1 | 11/2014 | Bui et al. |
| 2016/0087250 | A1 | 3/2016 | Gu et al. |
| 2016/0174553 | A1 | 6/2016 | Matta et al. |

FOREIGN PATENT DOCUMENTS

| | | |
|---|---|---|
| CN | 101828551 | 9/2010 |
| CN | 102669094 | 9/2012 |
| CN | 102659655 | 3/2014 |
| CN | 104193662 | 12/2014 |
| CN | 105961430 | 9/2016 |
| FR | 1432773 | 3/1966 |
| GB | 949094 | 2/1964 |
| GB | 2075366 | 11/1981 |
| JP | 2016074607 | 5/2016 |
| WO | 1990/09280 | 8/1990 |
| WO | 93/10088 | 5/1993 |
| WO | 2006/076334 | 7/2006 |

OTHER PUBLICATIONS

El-Ghobashy, M.A., et al., Selective removal of ammonia from wastewater using Cu(II)-loaded Amberlite IR-120 resincatalytic application for removal of dyes, Environ. Sci. Polut. Res., 30 (2023) pp. 106822-106822. (Year: 2023).

International Preliminary Report on Patentability mailed Apr. 8, 2021, in International Application No. PCT/US2019/53091 filed Sep. 26, 2019.

International Search Report and Written Opinion of the International Searching Authority Dated Feb. 10, 2020, of International PCT Application No. PCT/US2019/53091 filed Sep. 26, 2019.

Peer Contribution by China National Intellectual Property Dec. 5, 2019, of International PCT Application No. PCT/US2019/53091 filed Sep. 26, 2019.

Peer Contribution by European Patent Office Dec. 10, 2019, of International PCT Application No. PCT/US2019/53091 filed Sep. 26, 2019.

Peer Contribution by Japan Patent Office Nov. 15, 2019, of International PCT Application No. PCT/US2019/53091 filed Sep. 26, 2019.

Peer Contribution by Korean Intellectual Property Office Dec. 2, 2019, of International PCT Application No. PCT/US2019/53091 filed Sep. 26, 2019.

Yano, Set al. A flexible endoscope-assisted interhemispheric transcallosal approach through the contralateral ventricle for the removal of a third ventricle craniopharyngioma: A technical report. Surgical Neurology International, vol. 6, Mar. 19, 2015, S113-116; p. S115, second column, third paragraph.

(Continued)

*Primary Examiner* — Danah Al-Awadi

(57) ABSTRACT

The invention describes to compositions useful to stabilize peracetic acid, acetic acid and hydrogen peroxide compositions with polymeric phosphonic acid resins or with 1-hydroxyethylidene-1,1,-diphosphonic acid associated with the interior surface of a container to stabilize the peracetic acid, acetic and hydrogen peroxide compositions.

22 Claims, No Drawings

(56) References Cited

OTHER PUBLICATIONS

International Preliminary Report on Patentability mailed Apr. 8, 2021, in International Application No. PCT/US2019/53090 filed Sep. 26, 2019.
International Search Report and Written Opinion of the International Searching Authority Dated Jan. 23, 2020, of International PCT Application No. PCT/US2019/53090 filed Sep. 26, 2019.
Leveneur S et al.: "Synthesis of peroxypropionic acid from propionic acid and hydrogen peroxide over heterogeneous catalysts", Chemical Engineering Journal, Elsevier, Amsterdam, NL, vol. 147, No. 2-3, Apr. 15, 2009 (Apr. 14, 2009), pp. 323-329, XP025942743, ISSN: 1385-8947, DOI: 10.1016/J.CEJ.2008/11/045.
Peer Contribution by China National Intellectual Property Dec. 2, 2019, of International PCT Application No. PCT/US2019/53090 filed Sep. 26, 2019.
Peer Contribution by European Patent Office Dec. 2, 2019, of International PCT Application No. PCT/US2019/53090 filed Sep. 26, 2019.
Peer Contribution by Japan Patent Office Nov. 15, 2019, of International PCT Application No. PCT/US2019/53090 filed Sep. 26, 2019.
Peer Contribution by Korean Intellectual Property Office Dec. 2, 2019, of International PCT Application No. PCT/US2019/53090 filed Sep. 26, 2019.

PERACETIC ACID STABILIZED COMPOSITIONS WITH STABLE LINING

CROSS REFERENCE TO RELATED APPLICATIONS

This application claims priority to U.S. Provisional Ser. No. 62/737,475, filed on Sep. 27, 2018, the contents of which are expressly incorporated herein by reference for all purposes.

FIELD OF THE INVENTION

The invention relates generally to methods to stabilize peracetic acid and hydrogen peroxide compositions treated with phosphonic acid polymeric resins.

BACKGROUND OF THE INVENTION

A perfect disinfectant would offer complete and full microbiological sterilization, without harming humans and useful forms of life, be inexpensive, and non-corrosive. However, ideal disinfectants do not exist. Most disinfectants are also, by nature, potentially harmful (even toxic) to humans or animals.

The choice of disinfectant to be used depends on the particular situation. Some disinfectants have a wide spectrum (kill many different types of microorganisms), while others kill a smaller range of disease-causing organisms but are preferred for other properties (they may be non-corrosive, non-toxic, or inexpensive).

Peracetic acid and hydrogen peroxide compositions have been used to disinfect various surfaces including surfaces of instruments. However, contamination of the peracetic acid/hydrogen peroxide composition is commonplace by a user. Contamination of the peracetic acid/hydrogen peroxide composition causes degradation and instability of the composition.

A solution to the unstable nature/contamination of peracetic acid/hydrogen peroxide compositions has been addressed by use of 1-hydroxyethylidene-1,1,-diphosphonic acid, or 1-hydroxyethane 1,1-diphosphonic acid, or HEDP with a CAS Reg. No. of 2809-21-4 as a stabilizer. A disadvantage of the stabilizer is a residue left on the treated surface after the surface has dried. This can be critical when instruments, such as endoscopes, are used repeatedly. The residue can cause degradation of the surface of the instrument, thus reducing the useful life of the instrument, and ultimately increasing costs to the user since the instrument will need to be replaced more frequently. Additionally, the operators consider a residue of any type on an instrument, even if non-toxic, aesthetically unappealing.

Therefore, a need exists for sterilization composition that overcomes one or more of the current disadvantages noted above.

BRIEF SUMMARY OF THE INVENTION

The present embodiments surprisingly provide a simple but elegant method to stabilize peracetic acid/hydrogen peroxide compositions with a stabilized diphosphonic based chelator, such as 1-hydroxyethylidene-1,1,-diphosphonic acid. The present embodiments provide compositions, which upon drying, do not leave a residue on the treated surface. This aspect is highly advantageous in view of current products in the market that leave a residue on the treated surface after drying.

In various embodiments, the present invention provides for a composition that includes: (a) hydrogen peroxide; (b) organic acid; (c) a polymeric phosphonic acid resin based chelator; and (d) surfactant. The composition includes less than about 1 wt. % of an anticorrosive agent. The composition can further optionally include water.

In one aspect, the hydrogen peroxide present in the composition can be from about 0.5 wt. % to about 30 wt. %, from about 0.5 wt. % to about 1.5 wt. %, from about 0.8 wt. % to about 1.2 wt. %, from about 0.9 wt. % to about 1.1 wt. %, from about 20 wt. % to about 30 wt. % and all ranges and values from about 0.5 wt. % to about 30 wt. %.

In another aspect, the acetic acid present in the composition can be from about 1 wt. % to about 25 wt. %, from about 4 wt. % to about 20 wt. %, from about 4.5 wt. % to about 5.5 wt. %, from about 9 wt. % to about 17 wt. % and all ranges and values from about 1 wt. % to about 25 wt. %.

In still another aspect, the peracetic acid present in the composition can be from about 0.01 wt. % to about 25 wt. %, from about 0.05 wt. % to about 20 wt. %, from about 0.05 wt. % to about 0.1 wt. %, from about 0.05 wt. % to about 0.11 wt. %, from about 3.5 wt. % to about 8 wt. % and all ranges and values from about 0.01 wt. % to about 25 wt. %.

In yet another aspect, the polymeric resin chelator present in the composition can be from about 0.1 wt. % to about 10 wt. %, from about 0.1 wt. % to about 5 wt. %, from about 0.2 wt. % to about 2 wt. %, from about 0.5 wt. % to about 1.5 wt. % and all ranges and value from about 0.1 wt. % to about 10 wt. %.

In still yet another embodiment, the polymeric resin chelator or 1-hydroxyethylidene-1,1,-diphosphonic acid can be present in the composition of a container (wall) in an amount of from about 0.1 wt. % to about 50 wt. %, more particularly from about 0.2 wt. % to about 20 wt. %, even more particularly from about 0.5 wt. % to about 10 wt. %, from about 1 wt. % to about 5 wt. % or from about 2 wt. % to about 4 wt. % and all values and ranges from about 0.1 wt. % to about 50 wt. % with the remainder being a second suitable polymer to prepare a container.

In one aspect, the coblended/coextruded polymeric resin chelator or 1-hydroxyethylidene-1,1,-diphosphonic acid and second polymer can form the bottom of the container.

In various embodiments, the present invention provides for a composition that includes: (a) hydrogen peroxide, present in a concentration of about 0.5 wt. % to about 30 wt. %, e.g., about 28 wt. %; (b) acetic acid, present in a concentration of about 3 wt. % to about 25 wt. %, e.g., about 16 wt. %; (c) a phosphonic acid supported polymeric resin chelator present in a concentration of about 0.1 wt. % to about 5 wt. %, e.g., about 0.2 wt. % to about 0.7 wt. %; and, optionally, (d) Pluronic® 10R5 surfactant block copolymer, present in a concentration of about 2.0 wt. %, wherein the composition comprises less than about 0.1 wt. % of an anticorrosive agent, e.g., 0 wt. % of an anticorrosive agent. The composition can further optionally include water. In some embodiments, the hydrogen peroxide and acetic acid can combine to form peracetic acid, present in about 4 wt. % to about 8 wt. %, e.g., 6.8-7.5 wt. %.

In various embodiments, the present invention provides for a method of reducing the number of microbes located upon a substrate. In some embodiments, the method includes contacting the substrate with an effective amount of a composition including hydrogen peroxide, organic acid, a polymeric resin chelator, and surfactant, wherein the composition comprises less than about 1 wt. % of an anticorrosive agent, for a sufficient period of time, effective to reduce the number of microbes located upon the substrate The present embodiments also provide for a one part, liquid concentrate disinfectant or sterilant that includes: (a) about 10-65 wt. % hydrogen peroxide; (b) about 10-65 wt. % of an organic acid; (c) about 0.1-10 wt. % polymeric resin chelator; and, optionally, (d) about 0 wt. % to about 8 wt. %, e.g., 0.1 wt. % to about 8 wt. % surfactant and, optionally, 0 wt. % to about 2 wt. % anticorrosive agent, e.g., about 1 wt. % or less.

The present embodiments also provide for a one part, liquid concentrate disinfectant or sterilant composition that includes: (a) about 28 wt. % hydrogen peroxide (b) about 16 wt. % acetic acid; (c) about 0.1 wt. % to about 5 wt. % polymeric resin chelator; optionally, (d) about 2.0 wt. % Pluronic® 10R5 surfactant block copolymer and (e) about 53 wt. % deionized water. In some embodiments, the disinfectant or sterilant composition, at equilibrium, includes (a) about 20.0 to about 26.0 wt. % hydrogen peroxide, (b) about 9.0 to about 11.0 wt. % acetic acid, (c) about 0.1 wt. % to about 5 wt. % polymeric resin chelator; optionally, (d) about 2 wt. % Pluronic® 10R5 surfactant block copolymer (e) about 52.0 to about 62.0 wt. % deionized water and (f) about 4 to about 7.5 wt. % peracetic acid.

The present embodiments also provide for a kit that includes: (a) an enclosed container that includes a removable closure; (b) the composition as described herein, located inside the enclosed container, and (c) printed indicia located on the enclosed container.

The present embodiments also provide for a method of reducing the number of microbes located upon a substrate. In some embodiments, the method includes contacting the substrate with an effective amount of the compositions described herein, for a sufficient period of time, effective to reduce the number of microbes located upon the substrate.

The present embodiments also provide for a method of killing or inhibiting a microorganism. In some embodiments, the method includes contacting the microorganism with an antimicrobially effective amount of the composition described herein, for a sufficient period of time, effective to kill or inhibit the microorganism.

The present embodiments also provide for a method of disinfecting a substrate. In some embodiments, the method includes contacting the substrate with an effective amount of the compositions described herein, for a sufficient period of time, effective to disinfect the substrate. The present embodiments also provide for a method of disinfecting a medical device. In some embodiments, a method of disinfecting an endoscopic device is achieved with the use of the compositions described herein.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed descriptions are to be regarded as illustrative in nature and not restrictive.

DETAILED DESCRIPTION

In the specification and in the claims, the terms "including" and "comprising" are open-ended terms and should be interpreted to mean "including, but not limited to . . . ." These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" should be interpreted to include not only the explicitly recited amount of about 0.1 wt. % to about 5 wt. %, but also the individual concentrations (e.g., 1%, 2%, 3%, and 4%) and the sub-ranges (e.g., 0.5%, 1.1%, 2.2%, 3.3%, and 4.4%) within the indicated range.

When describing the present invention, the following terms have the following meanings, unless otherwise indicated.

The term "about" can allow for a degree of variability in a value or range, for example, within 10%, within 5%, or within 1% of a stated value or of a stated limit of a range.

The term "room temperature" as used herein refers to a temperature of about 15° C. to 28° C.

The term "hydrogen peroxide" or "$H_2O_2$" refers to the compound chemically designated as dihydrogen dioxide, having the CAS Reg. No. 7722-84-1. In specific embodiments of the invention, the hydrogen peroxide includes water. In further specific embodiments of the invention, the hydrogen peroxide is 50% wt. % hydrogen peroxide in water. The hydrogen peroxide can be present in the composition, in any suitable and effective amount.

The term "organic acid" refers to an organic compound with acidic properties. The most common organic acids are the carboxylic acids, whose acidity is associated with their carboxyl group —COOH. Sulfonic acids, containing the group —$SO_2OH$, are relatively stronger acids. The relative stability of the conjugate base of the acid determines its acidity. Other groups can also confer acidity, usually weakly: —OH, —SH, the enol group, and the phenol group. Organic compounds containing these groups are generally referred to as organic acids. An example of an organic acid is acetic acid.

The term "acetic acid" or "ethanoic acid" refers to an organic compound with the chemical formula $CH_3CO_2H$ (also written as $CH_3COOH$), having the CAS Reg. No. 64-19-7.

1-hydroxyethylidene-1,1,-diphosphonic acid, also known as 1-hydroxyethane 1,1-diphosphonic acid, has a CAS Reg. No. of 2809-21-4 is known as a stabilizer. It is also referred to as etidronic acid (INN) or 1-hydroxyethane 1,1-diphosphonic acid (HEDP). The compound has the formula:

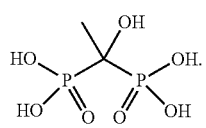

The term "glacial acetic acid" refers to undiluted and relatively concentrated, water-free (anhydrous) acetic acid.

The term "peracetic acid," "peroxyacetic acid," or "PAA" refers to an organic compound with the chemical formula $CH_3CO_3H$.

The term "chelator," "chelant" or "chelating agent" refers to a compound that forms soluble, complex molecules with certain metal ions, inactivating the metal ions (or to some extent, countering the effects of the metal ions), so that they cannot normally react with other compounds, elements or ions. In specific embodiments, the chelator effectively chelates transition metals. One suitable type of chelator is/are bisphosphonate acids or salts, more particularly, bisphosphonates with acid functionality, such as 1-hydroxyethylidene-1,1,-diphosphonic acid. In specific embodiments, the chelator will effectively chelate any transition metals and/or alkaline earth metals present in any of the components of the composition. In certain embodiments, the chelator can be a polymeric phosphinopolycarboxylic acid, such as ACU-MER 4161 (available from Rohm & Haas), or polymers derived from, for example, vinylidene diphosphonic acid (e.g., polyvinylidene diphosphonic acid) or vinyl phosphonic acid (VPA)(polyvinylphosphonic acid) as described in U.S. Pat. Nos. 5,980,776 and 5,534,235 the contents of which are incorporated herein in their entirety.

In particular, the chelator can be a phosphonic or diphosphonic acid group that is incorporated into a polymer.

The phosphonic acid polymers can be prepared by a variety of methods which generally fall into one of two categories: the polymerization of a phosphonic acid monomer or the post-modification of a polymer to introduce phosphonic acid groups into the polymer.

In the first aspect, ethylenically-unsaturated phosphonic acids can be used to prepare phosphonic acid homopolymers and copolymers by addition polymerization methods. Polymerizations of this type are characterized by initiation, propagation, and termination events. The addition polymerization is carried out by using a free radical initiator to induce or initiate the successive additions of large numbers of the ethylenically-unsaturated monomers in a chain reaction which continues until the reactive propagating radical on the growing polymer chain is destroyed or terminated. Examples of such monomers include, but are not limited to, vinyl phosphonic acid (VPA), vinylidene diphosphonic acid (VDPA), isopropenyl phosphonic acid, and 2-acrylamido-2-methylpropanephosphonic acid. Suitable comonomers include, but are not limited to, acrylic acid or one of its salts, acrylamide, methacrylic acid or one of its salts, methacrylamide, maleic acid or one of its salts, maleic anhydride, methyl acrylate, ethyl acrylate, or methyl methacrylate.

The polymerization methods that can be employed to produce the polymers used in the present invention include free radical methods which are well known to those skilled in the art, including solution polymerization, inverse emulsion polymerization, inverse microsuspension polymerization, and dispersion polymerization.

Another general method that can be used to produce phosphonic acid polymers which can be used in the present invention encompasses the reaction of a preformed polymer with a phosphorus containing reagent to produce a phosphonic acid modified polymer. For example, polymers bearing amidoalkyl phosphonic acid groups can be prepared by the amidation or transamidation of polymers bearing carboxylic acid or amide groups with aminoalkyl phosphonic acids. Suitable aminoalkyl phosphonic acids include, but are not limited to, aminomethane phosphonic acid (AMPA), N,N-bis(phosphonoalkyl) alkylenediamines prepared from diamines and haloalkyl phosphonic acids or formaldehyde/phosphorous acid, 1-amino-1,1-diphosphonoalkanes prepared from nitriles and phosphorous acid, and other aminoalkyl phosphonic acids prepared by the reaction of ethylenically-unsaturated amines with phosphorus reagents bearing a phosphorus-hydrogen bond. In another example, aminoalkyl phosphonic acid bearing polymers can be produced by the reaction of an amine-bearing polymer with a haloalkane phosphonic acid or with formaldehyde/phosphorous. In a final example, phosphonic acid polymers can be prepared by the oxidation of phosphinic acid bearing polymers with oxidants such as hydrogen peroxide.

In one aspect, the polyphosphonic acid resin or 1-hydroxyethylidene-1,1,-diphosphonic acid can be extruded/coextruded with other polymers to form films or shaped into a container to hold the remaining components of the embodiments. Suitable extrusion polymers include, for example, polyethylenes and polypropylenes.

In another embodiment, vinylidene diphosphonic acid or vinyl phosphonic acid (VPA) can be used to coat the lining of a container and then be polymerized to the surface of the container as a protective/chelating coating.

It should be understood that the requisite phosphonic acid group may need to be first treated with an acidic solution to provide the free acid as necessary.

The polymeric resin chelator can be added to the compositions described herein. Alternatively, the compositions can be passed through the polymeric resin chelator. In another embodiment, the polymeric resin chelator can be in the form of a membrane and the membrane is in contact and remains in contact with the composition. In still another embodiment, the polymeric resin chelator is incorporated into a container which hold the compositions described herein. In certain embodiments, the polymer resin chelator is coated onto the interior of a container that is used to store the compositions described herein. In still another embodiment, the polymeric chelator can be placed within a "mesh pouch" or other containment system that can be placed into a container with the compositions described herein.

One advantage of utilizing the polymeric resin chelator is that users of the compositions often contaminate the composition in between uses. That is, an individual may place a used wipe, sponge, or rag, medical device, instrument, etc. against or within the container that houses the composition, thus transferring contaminants to the container. The polymeric resin chelators described herein help to stabilize the peracetic acid/hydrogen peroxide compositions by complexing with/removing the undesired contaminants, such as metal ions.

It should be understood that one advantage of the polymeric resin chelator is that it does not dissolve in the embodiments described herein. That is, the polymer resin remains in the solution but does not become homogeneous with the remaining components. Not to be limited by theory, it is believed that the polymeric resin chelator provides surface contact with the components of the composition and removes metallic contaminants from the solution to stabilize the composition. As a result, the components of the composition, e.g., the hydrogen peroxide and/or the peracetic acid, do not degrade over time due to metallic components.

Additionally, the polymeric resin chelator does not cause a residue to remain on a treated surface after the surface has been treated with the compositions described herein.

The term "anticorrosive agent" or "corrosion inhibitor" refers to a compound that, when added to a liquid or gas, decreases the corrosion rate of a material, typically a metal or an alloy. Suitable anticorrosive agents include, e.g., benzotriazole and sodium dodecyl sulfate (SDS).

The term "benzotriazole" or "BTA" refers to the compound 1H-benzotriazole or 1,2,3-benzotriazole, having the CAS Reg. No. 95-14-7.

The term "surfactant" refers to a compound capable of lowering the surface tension of a liquid, the interfacial tension between two liquids, or that between a liquid and a solid. Surfactants may act as detergents, wetting agents, emulsifiers, foaming agents, and/or dispersants. The surfactant can be non-ionic, anionic or cationic. Additionally, the surfactant can include one or more non-ionic surfactants, one or more anionic surfactants, and/or one or more cationic surfactants.

The term "non-ionic surfactant" or "nonionic surfactant" refers to a surfactant, in which the total number of electrons is equal to the total number of protons, giving it a net neutral or zero electrical charge. One suitable class of non-ionic surfactants includes the Pluronic® poloxamers.

Poloxamers are nonionic triblock copolymers composed of a central hydrophobic chain of polyoxypropylene (poly (propylene oxide)) flanked by two hydrophilic chains of polyoxyethylene (poly(ethylene oxide)). Poloxamers are also known by the trade name Pluronics®.

Because the lengths of the polymer blocks can be customized, many different poloxamers exist, that have slightly different properties. For the generic term "poloxamer," these copolymers are commonly named with the letter "P" (for poloxamer) followed by three digits, the first two digits "x" (times) 100 give the approximate molecular mass of the polyoxypropylene core, and the last digit x 10 gives the percentage polyoxyethylene content (e.g., P407=Poloxamer with a polyoxypropylene molecular mass of 4,000 g/mol and a 70% polyoxyethylene content). For the Pluronic® tradename, coding of these copolymers starts with a letter to define its physical form at room temperature (L=liquid, P=paste, F=flake (solid)) followed by two or three digits. The first digit (two digits in a three-digit number) in the numerical designation, multiplied by 300, indicates the approximate molecular weight of the hydrophobe; and the last digit x 10 gives the percentage polyoxyethylene content (e.g., L61=Pluronic with a polyoxypropylene molecular mass of 1,800 g/mol and a 10% polyoxyethylene content). In the example given, poloxamer 181 (P181)=Pluronic L61.

The term "Pluronic® 10R5 surfactant block copolymer" refers to polyoxypropylene-polyoxyethylene block copolymer, having the CAS Reg. No. 9003-11-6.

Other nonionic surfactants include, but are not limited to, fatty alcohols, polyoxyethylene glycol alkyl ethers (Brij), polyoxypropylene glycol alkyl ethers, glucoside alkyl ethers, polyoxyethylene glycol octylphenol ethers, polyoxyethylene glycol alkylphenol ethers, glycerol alkyl esters, polyoxyethylene glycol sorbitan alkyl esters, sorbitan alkyl esters, cocamide MEAs, cocamide DEAs, dodecyl dimethylamine oxides, block copolymers of polyethylene glycol and polypropylene glycols.

Suitable fatty alcohols include, but are not limited to, cetyl alcohol, stearyl alcohol, cetostearyl alcohol (consisting predominantly of cetyl and stearyl alcohols) and oleyl alcohol.

Suitable polyoxyethylene glycol alkyl ethers, include but are not limited to (Brij), for example $CH_3-(CH_2)_{10-16}-(O-C_2H_4)_{1-25}-OH$, or octaethylene glycol monododecyl ether or pentaethylene glycol monododecyl ether.

Suitable polyoxypropylene glycol alkyl ethers include $CH_3-(CH_2)_{10-16}-(O-C_3H_6)_{1-25}-OH$.

Suitable glucoside alkyl ethers include $CH_3-(CH_2)_{10-16}-(O\text{-Glucoside})_{1-3}-OH$, and, for example, include decyl glucoside, lauryl glucoside, and octyl glucoside.

Suitable polyoxyethylene glycol octylphenol ethers include $C_8H_{17}-(C_6H_4)-(O-C_2H_4)_{1-25}-OH$. One exemplary material is TRITON X-100.

Suitable polyoxyethylene glycol alkylphenol ethers include $C_9H_{19}-(C_6H_4)-(O-C_2H_4)_{1-25}-OH$. One example is Nonoxynol-9.

In one aspect, a suitable glycerol alkyl ester is glyceryl laurate.

In another aspect, a suitable polyoxyethylene glycol sorbitan alkyl ester is polysorbate.

In still another aspect, suitable sorbitan alkyl esters are referred to as SPAN, e.g., SPAN-20, sorbitan monolaurate.

The term "cationic surfactant" refers to a surfactant, in which the total number of electrons is less than the total number of protons, giving it a net positive electrical charge.

One kind of cationic surfactant is typically based on pH-dependent primary, secondary or tertiary amines. The primary amines become positively charged at a pH<10, and the secondary amines become charged at a pH<4. One example is octenidine dihydrochloride.

Another type of cationic surfactant is based on permanently charged quaternary ammonium cations, such as alkyltrimethylammonium salts. These include but are not limited to cetyl trimethylammonium bromide (CTAB), hexadecyl trimethyl ammonium bromide, cetyl trimethylammonium chloride (CTAC), cetylpyridinium chloride (CPC), polyethoxylated tallow amine (POEA), benzalkonium chloride (BAC), benzethonium chloride (BZT), 5-Bromo-5-nitro-1,3-dioxane, dimethyldioctadecylammonium chloride and dioctadecyldimethylammonium bromide (DODAB).

The term "anionic surfactant" refers to a surfactant in which the total number of electrons is greater than the total number of protons, giving it a net negative electrical charge. One suitable anionic surfactant is sodium lauryl sulfate.

Anionic surfactants have a permanent anion, such as a sulfate, sulfonate or phosphate anion associated with the surfactant or has a pH-dependent anion, for example, a carboxylate.

Sulfates can be alkyl sulfate or alkyl ether sulfates.

Suitable alkyl sulfates include, but are not limited to, ammonium lauryl sulfate or sodium lauryl sulfate (SDS). Suitable alkyl ether sulfates include, but are not limited to, sodium laureth sulfate, also known as sodium lauryl ether sulfate (SLES) or sodium myreth sulfate.

Suitable sulfonates include, but are not limited to, docusate (dioctyl sodium sulfosuccinate), fluorosurfactants that are sulfonated and alkyl benzene sulfonates.

Typical sulfonated fluorosurfactants include, but are not limited to, perfluorooctanesulfonate (PFOS) or perfluorobutanesulfonate.

Phosphates are typically alkyl aryl ether phosphates or alkyl ether phosphates.

Carboxylates are typically alkyl carboxylates, such as fatty acid salts (soaps), such as for example, sodium stearate. Alternatively, the carboxylate can be, but is not limited to, sodium lauryl sarcosinate. In another alternative aspect, the carboxylate includes but is not limited to a carboxylated fluorosurfactant, such as perfluorononanoate, or perfluorooctanoate (PFOA or PFO).

When a single surfactant molecule exhibits both anionic and cationic dissociations it is called amphoteric or zwitterionic. Zwitterionic (amphoteric) surfactant is based on primary, secondary or tertiary amines or quaternary ammonium cation also having a sulfonate, carboxylate or a phosphate.

Suitable zwitterionic surfactants include, but are not limited to, CHAPS (3-[(3-Cholamidopropyl)dimethylammonio]-1-propanesulfonate) or a sultaine. The sultaine is typically cocamidopropyl hydroxysultaine.

In one aspect, the carboxylate cation is an amino acid, imino acid or betaine. In one aspect, the betaine is typically cocamidopropyl betaine.

When the zwitterionic surfactant includes a phosphate, lecithin is often chosen as the counterion.

The term "sodium dodecyl sulfate," "SDS," "NaDS," "sodium lauryl sulfate," or "SLS" refers to an organic compound with the formula $CH_3(CH_2)_{11}OSO_3Na$), having the CAS Reg. No. 151-21-3.

The term "disinfectant" refers to a substance that when applied to non-living objects, destroys microorganisms that are living on the objects. The term "disinfect" refers to the process of destruction or prevention of biological contaminants. Disinfection does not necessarily kill all microorganisms, especially nonresistant bacterial spores; it is less effective than sterilization, which is an extreme physical and/or chemical process that kills all types of life.

Disinfectants are different from other antimicrobial agents such as antibiotics, which destroy microorganisms within the body, and antiseptics, which destroy microorganisms on living tissue. Disinfectants are also different from biocides. The latter are intended to destroy all forms of life, not just microorganisms. Sanitizers are substances that simultaneously clean and disinfect.

The term "sterilant" (via sterilization) refers to a substance that when applied to non-living objects, destroys all viable forms of microbial life, when used according to labeling.

The term "CFU" refers colony forming units and is a measure of viable cells in which a colony represents an aggregate of cells derived from a single progenitor cell.

In various embodiments, the composition includes: (a) hydrogen peroxide; (b) an organic acid; (c) a chelator such as 1-hydroxyethylidene-1,1,-diphosphonic acid extruded in a container wall, a polymeric resin that includes the polymerized 1-hydroxyethylidene-1,1,-diphosphonic acid that is condensed with an ethylenic carboxylic acid (e.g. acrylic acid, methacrylic acid, alkoxyacrylic acid ester or alkoxymethacrylic acid ester) or vinylidene diphosphonic acid or a copolymer of vinylidene diphosphonic acid, in particular a phosphonic acid containing polymer, copolymer or a support functionalized with phosphonic acid groups; and (d) surfactant.

It is appreciated that those of ordinary skill in the art fully understand and appreciate that when a composition includes more than one component, the composition may also include additional components formed as a product of the reaction between the components in the composition. For example, those of skill in the art fully understand and appreciate that a composition including hydrogen peroxide ($H_2O_2$) and acetic acid ($CH_3CO_2H$) also includes the oxidized product of acetic acid, peracetic acid ($CH_3CO_3H$). As such, reference to the composition including hydrogen peroxide ($H_2O_2$) and acetic acid ($CH_3CO_2H$) is proper, as well as reference to the composition being formed from hydrogen peroxide ($H_2O_2$) and acetic acid ($CH_3CO_2H$). To that end, a composition of acetic acid and hydrogen peroxide will include significant and appreciable amounts of peracetic acid formed from the reaction of acetic acid with hydrogen peroxide. Further, it is appreciated that those of ordinary skill in the art fully understand and appreciate that an equilibrium exists between hydrogen peroxide and acetic acid, and peracetic acid.

In various embodiments, peracetic acid is present in about 1 wt. % to about 15 wt. % of the composition. In some embodiments, peracetic acid is present in about 2-14 wt. %, 3-12 wt. %, 4-11 wt. %, 5-9 wt. %, about 6-8 wt. %, or about 1 wt. %, 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, or about 15 wt. % or more of the composition. In some embodiments, peracetic acid is present in about 5 wt. % to about 7.5 wt. % of the composition.

In various embodiments, hydrogen peroxide is present in about 10 wt. % to about 50 wt. % of the composition. In some embodiments (e.g., before equilibration and formation of PAA), the hydrogen peroxide is present in about 15-45 wt. %, 20-35 wt. %, or about 25-30 wt. % of the composition. In some embodiments (e.g., after equilibration and formation of PAA), the hydrogen peroxide is present in about 10-40 wt. %, 15-35 wt. %, 18-30 wt. % or about 20-26 wt. % of the composition. In some embodiments, the hydrogen peroxide is present in about 16 wt. %, 18 wt. %, 20 wt. %, 21 wt. %, 22 wt. %, 23 wt. %, 24 wt. %, 25 wt. %, 26 wt. %, 27 wt. %, 28 wt. %, 29 wt. %, 30 wt. %, 31 wt. %, 32 wt. %, 34 wt. %, or about 36 wt. %. In some embodiments, the hydrogen peroxide is about 35 wt. % in water, present in about 18 wt. % to about 32 wt. % of the composition. In some embodiments, hydrogen peroxide is about 35 wt. % in water, present in about 28 wt. % of the composition. In some embodiments, hydrogen peroxide is about 35 wt. % in water, present in about 20 wt. % to about 26 wt. % of the composition.

In various embodiments, the organic acid includes acetic acid. In some embodiments, the organic acid comprises glacial acetic acid. In some embodiments, the organic acid includes acetic acid, present in at least about 3 wt. % of the composition. In some embodiments (e.g., before equilibration and formation of PAA), the organic acid includes acetic acid, present in about 1-50 wt. %, 2-45 wt. %, 3-40 wt. %, 4-35 wt. %, 6-30 wt. %, 8-24 wt. %, 10-22 wt. %, 12-20 wt. %, about 14-18 wt. %, or about 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, or about 25 wt. % of the composition. In some embodiments (e.g., after equilibration and formation of PAA), the organic acid includes acetic acid, present in about 1-20 wt. %, 2-18 wt. %, 3-17 wt. %, 4-16 wt. %, 5-15 wt. %, 6-14 wt. %, 7-13 wt. %, 8-12 wt. %, or about 9-11 wt. % of the composition. In some embodiments, the organic acid includes acetic acid, present in about 9 wt. % to about 11 wt. % of the composition. In some embodiments, the organic acid comprises acetic acid, present in about 16 wt. % of the composition.

In various embodiments, the chelator effectively chelates transition metals. In some embodiments the chelator includes a polymeric phosphonic acid resin. In other embodiments, 1-hydroxyethylidene-1,1,-diphosphonic acid is incorporated (e.g., extruded) with a polymer to form a container wall which holds the liquid components described herein.

In various embodiments, the surfactant includes a nonionic surfactant. In various embodiments, the surfactant includes at least one of an anionic and cationic surfactant. In some embodiments the surfactant includes Pluronic® 10R5 surfactant block copolymer. In some embodiments the surfactant includes Pluronic® 10R5 surfactant block copolymer, present in at least about 0.1 wt. % of the composition. In some embodiments, the surfactant includes Pluronic® 10R5 surfactant block copolymer, present in about 0.1-8.0 wt. %, 0.3-7.0 wt. %, 0.5-6.0 wt. %, 0.7-5.0 wt. %, 0.8-4.0 wt. %, about 1.0-3.0 wt. %, or about 0.5 wt. %, 1.0 wt. %, 1.4 wt. %, 1.8 wt. %, 2.0 wt. %, 2.2 wt. %, 2.6 wt. %, or about 3.0 wt. % of the composition. In some embodiments, the surfactant includes Pluronic® 10R5 surfactant block copolymer, present in about 2 wt. % of the composition.

In various embodiments, the composition includes about 28 wt. % hydrogen peroxide, about 16 wt. % acetic acid, about 0.2 wt. % to about 2 wt. % polymeric resin chelator, optionally, about 2.0 wt. % Pluronic® 10R5 surfactant block copolymer, and about 53 wt. % deionized water.

In various embodiments, the composition includes about 20.0 to about 26.0 wt. % hydrogen peroxide, about 9.0 to about 11.0 wt. % acetic acid, about 0.2 wt. % to about 2 wt. % polymeric resin chelator, optionally, about 2.0 wt. % Pluronic® 10R5 surfactant block copolymer, about 53 wt. % deionized water and about 6.8 to about 7.5 wt. % peracetic acid.

In specific embodiments, the composition of the present invention can be formulated as, can exist as, and can be commercially available as a liquid concentrate disinfectant or sterilant. The term "liquid concentrate" refers to a composition that is relatively undiluted and concentrated, having a low content of carrier, e.g., water. Having the composition be commercially available as a liquid concentrate will typically save costs associated with the manufacturing, shipping, and/or storage of the product.

When the composition of the present invention is formulated as a liquid concentrate, the concentrate can subsequently be diluted with an appropriate amount of carrier (e.g., water) prior to use. Additionally, although considered to be a concentrate, when the composition of the present invention is formulated as a liquid concentrate, a discrete and finite amount of carrier (e.g., water) can be employed.

In various embodiments, the present invention provides for a one part, liquid concentrate disinfectant or sterilant including about 20.0 about 26.0 wt. % hydrogen peroxide, about 9.0 to about 11.0 wt. % acetic acid, about 0.2 wt. % to about 2 wt. % polymeric resin chelator, about 2.0 wt. % Pluronic® 10R5 surfactant block copolymer, about 53 wt. % deionized water and about 6.8 to about 7.5 wt. % peracetic acid.

The composition of the present invention can be formulated for application, depending upon the user's preference as well as the ultimate application of the composition. For example, the composition can be formulated for use in a sprayable composition, atomized liquid sprayer, or liquid applicator. Such formulations can include at least one of a spray bottle, motorized sprayer, wipe, cloth, sponge, non-woven fabric, and woven fabric. Such formulations may be particularly suitable for applying the composition to a surface of a hospital, physician's office, medical clinic, medical facility, dental office, dental facility, airport, school, pet store, zoo, children's day care, elderly nursing home, museum, movie theatre, athletic facility, sporting arena, gymnasium, rest room, bathroom, shopping center, amusement park, church, synagogue, mosque, temple, restaurant, food processing facility, food manufacturing facility, pharmaceutical company, hot-tub, sauna, and/or clean room.

Such liquid formulations may be particularly suitable for applying the composition to metal, plastic, natural rubber, synthetic rubber, glass, stone, grout, fiberglass, wood, concrete, construction products, and/or building products.

In various embodiments, the composition of the invention can be configured for use in contacting at least one of medical equipment, medical device (e.g., reusable medical device or instrument, such as an endoscope), surface in the medical industry, dental equipment, dental device, and surface in the dental industry. In some embodiments, the composition of the invention may be used in the reconditioning of a soiled endoscopic device. In some embodiments, the compositions of the invention are useful during the disinfection step of the high level disinfection cleaning process following use of the endoscope in a medical procedure. The term "endoscopic device" includes a plurality of minimally invasive surgical devices (e.g., scopes) that have been developed for specific uses. For example, upper and lower endoscopes are utilized for accessing the esophagus/stomach and the colon, respectively, angio scopes are utilized for examining blood vessels, and laparoscopes are utilized for examining the peritoneal cavity.

In some embodiments, catalysts for the formation of peracetic acid from hydrogen peroxide and acetic acid are employed. Suitable catalysts include, for example, inorganic acids, such as sulfuric acid ($H_2SO_4$), hydrochloric acid (HCl), phosphoric acid ($H_3PO_4$), and nitric acid ($HNO_3$).

In specific embodiments, the composition of the present invention can be non-corrosive. The term "non-corrosive" or "noncorrosive" refers to a substance that will not destroy or irreversibly damage another surface or substance with which it comes into contact. The main hazards to people include damage to the eyes, the skin, and the tissue under the skin; inhalation or ingestion of a corrosive substance can damage the respiratory and gastrointestinal tracts. Exposure results in chemical burn. Having the composition be relatively non-corrosive will allow the user to employ the composition over a wider range of uses, exposing the composition to a wider range of substrates. For example, having the composition be relatively non-corrosive will allow the user to employ the composition as a disinfectant or sterilant with certain medical devices that are highly sensitive to corrosive substances.

In specific embodiments, the composition of the present invention can be non-toxic. The term "non-toxic" refers to a substance that has a relatively low degree to which it can damage a living or non-living organism. Toxicity can refer to the effect on a whole organism, such as an animal, bacterium, or plant, as well as the effect on a substructure of the organism, such as a cell (cytotoxicity) or an organ (organotoxicity), such as the liver (hepatotoxicity). A central concept of toxicology is that effects are dose-dependent; even water can lead to water intoxication when taken in large enough doses, whereas for even a very toxic substance such as snake venom there is a dose below which there is no detectable toxic effect. Having the composition be relatively non-toxic will allow a wider range of users be able to safely handle the composition, without serious safety concerns or risks.

In specific embodiments, the composition of the present invention can be stable over extended periods of time (i.e., has a long-term stability). The term "long-term stability" refers to a substance undergoing little or no physical and/or chemical decomposition or degradation, over extended periods of time.

In further specific embodiments, the composition of the present invention can be stable over extended periods of time, such that at about 1 atm and about 19° C., less than about 20 wt. %, e.g., 15 wt. %, 10 wt. %, or 5 wt. %, of each component independently degrades over about one year. In additional specific embodiments, the composition of the present invention can be stable over extended periods of time, such that at about 1 atm and about 19° C., at least about 80 wt. % of each component, e.g., 85 wt. %, 90 wt. %, 95 wt. %, is independently present after about one year.

Having the composition be relatively stable over extended periods of time will allow the composition to retain its effectiveness over that time, ensuring that it will remain useful and active for its intended purpose. In contrast, in those compositions that do not retain their effectiveness over that time, product loss can result, which can be financially costly. Additionally, risks associated with the use of a product that has lost some or all of its effectiveness for the intended purpose can be hazardous, in that the product may not effectively achieve the desired goal. For example, when used to disinfect or sterilize a medical device, use of a composition that has lost some or all of its effectiveness as a disinfectant or sterilant may not effectively disinfect or sterilize the medical device. Medical injuries can be sustained by the patient, including serious infections.

In specific embodiments, the composition of the present invention can be formulated as, can exist as, and is commercially available as, a one-part composition. The term "one-part composition" refers to all chemical components of a composition being present together, such that they are each in intimate and physical contact with one another, and are each present in a single container. Having the composition be commercially available as a one-part composition will be more cost effective (e.g., lower manufacturing costs associated with fewer containers), and will avoid the necessity of the user mixing or combining multiple components together, prior to using.

In specific embodiments, the composition of the present invention can be essentially free of buffer. In further specific embodiments, the composition of the present invention can include less than about 0.1 wt. % buffer. The term "buffer," "buffering agent," or "buffering substance" refers to a weak acid or base used to maintain the acidity (pH) of a solution at a chosen value. The function of a buffering agent is to prevent a rapid change in pH when acids or bases are added to the solution. Buffering agents have variable properties—some are more soluble than others; some are acidic while others are basic.

In specific embodiments, the composition of the present invention can be essentially free of transition metals. In further specific embodiments, the composition of the present invention can include less than about 0.001 wt. % transition metals. In further specific embodiments, the composition of the present invention can include less than about 0.0001 wt. % transition metals. In further specific embodiments, the composition of the present invention can include less than about 0.00001 wt. % transition metals. Having the composition include a minimal amount of transition metals decreases the likelihood that the transition metals will cause degradation and/or decomposition of the composition, over the extended periods of time associates with the manufacturing, shipping, and storage of the composition. This is especially so when the composition is formulated as a concentrated, one-part composition.

The term "transition metal," "transition metals" or "transition element" refers to an element whose atom has an incomplete d sub-shell, or which can give rise to cations with an incomplete d sub-shell. Transition metals include scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs) and copernicium (Cn).

In specific embodiments of the invention, the transition metal can be naturally occurring. Naturally occurring transition metals include scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), and mercury (Hg).

In specific embodiments, the composition of the present invention can be essentially free of heavy metals. In further specific embodiments, the composition of the present invention can include less than about 0.001 wt. % heavy metals. In further specific embodiments, the composition of the present invention can include less than about 0.0001 wt. % heavy metals. In further specific embodiments, the composition of the present invention can include less than about 0.00001 wt. % heavy metals. Having the composition include a minimal amount of heavy metals decreases the likelihood that the transition metals will cause degradation and/or decomposition of the composition, over the extended periods of time associates with the manufacturing, shipping, and storage of the composition. This is especially so when the composition is formulated as a concentrated, one-part composition.

The term "heavy metal," "heavy metals" or "toxic metal" refers to metals that are relatively toxic, and mainly include the transition metals, some metalloids, lanthanides, and actinides. Examples of toxic metals include, e.g., iron (Fe), cobalt (Co), copper (Cu), manganese (Mn), molybdenum (Mo), zinc (Zn), mercury (Hg), plutonium (Pu), lead (Pb), vanadium (V), tungsten (W), cadmium (Cd), aluminium (Al), beryllium (Be), and arsenic (As).

The present invention also provides for a kit that includes: (a) an enclosed container that includes a removable closure; (b) the composition of the present invention as described herein, which is located inside the enclosed container; and (c) printed indicia located on the enclosed container.

In specific embodiments, the enclosed container can be opaque. In additional specific embodiments, the enclosed container can be manufactured from high density polyethylene (HDPE), thereby providing the requisite opacity. Having the enclosed container be manufactured from high density polyethylene (HDPE) will decrease the likelihood that the composition will degrade and/or decompose over extended periods of time, due to excessive exposure to direct sunlight.

The term "high-density polyethylene" or "HDPE" refers to a polyethylene thermoplastic made from petroleum. The mass density of high-density polyethylene can range from 0.93 to 0.97 g/cm$^3$. Although the density of HDPE is only marginally higher than that of low-density polyethylene, HDPE has little branching, giving it stronger intermolecular forces and tensile strength than LDPE. The difference in strength exceeds the difference in density, giving HDPE a higher specific strength. It is also harder and more opaque and can withstand somewhat higher temperatures (120° C./248° F. for short periods, 110° C./230° F. continuously). HDPE is resistant to many different solvents.

The term "solvent" as used herein refers to a liquid that can dissolve a solid, liquid, or gas. Non-limiting examples of solvents are silicones, organic compounds, water, alcohols, ionic liquids, and supercritical fluids.

The term "opaque" refers to an object that is neither transparent (allowing all light to pass through) nor translucent (allowing some light to pass through). When light strikes an interface between two substances, in general some may be reflected, some absorbed, some scattered, and the rest transmitted (also see refraction). Reflection can be diffuse, for example light reflecting off a white wall, or specular, for example light reflecting off a mirror. An opaque substance transmits no light, and therefore reflects, scatters, or absorbs all of it. Both mirrors and carbon black are opaque. Opacity depends on the frequency of the light being considered. For instance, some kinds of glass, while transparent in the visual range, are largely opaque to ultraviolet light. More extreme frequency-dependence is visible in the absorption lines of cold gases.

To further decrease the likelihood that the composition will degrade and/or decompose over extended periods of time, the composition should avoid, when feasible: excessive exposure to direct sunlight, excessive heat and/or elevated temperatures. As such, in specific embodiments, the enclosed container of the kit can include printed indicia, with instructions to avoid excessive heat, elevated temperatures, direct sunlight, or a combination thereof.

Over extended periods of time, hydrogen peroxide and/or peracetic acid present in the composition will be susceptible to degrade or decompose (and a portion of the hydrogen peroxide may degrade or decompose), thereby evolving oxygen.

In specific embodiments, the enclosed container includes a head space, pressure valve, or combination thereof. In specific embodiments, the enclosed container includes a pressure valve, configured to release excessive gas from within the enclosed container. The presence of a head space and pressure valve in the container will allow for the escape of gas (e.g., oxygen) from the enclosed container, without the likelihood that the container will explode from the elevated pressure that would otherwise develop.

The term "head space" refers to a portion of the inside of a container that is not occupied by the liquid contents of the container. In particular, when a container includes a liquid composition, a head space can be present in the container such that a portion of the inside of the container does not include liquid composition, but instead includes a gas or vacuum. In specific embodiments, the head space can include oxygen (O2), peracetic acid and/or acetic acid vapor. In further specific embodiments, the head space can be present in up to about 20% (v/v) of the inside of the enclosed container.

The term "pressure valve" refers to a mechanical device that will permit for the passage of gas and not fluid, preferably in one direction only, for example, exiting a container housing the pressure valve, and not entering the container.

The composition of the present invention can be used to effectively reduce the number of microbes located upon a substrate. In specific embodiments, the composition can effectively kill and/or inhibit a microorganism (e.g., virus, fungus, mold, slime mold, algae, yeast, mushroom and/or bacterium), thereby disinfecting or sterilizing the substrate.

In additional specific embodiments, the composition can effectively sanitize a substrate, thereby simultaneously cleaning and disinfecting or sterilizing the substrate. In additional specific embodiments, the composition can effectively kill or inhibit all forms of life, not just microorganisms, thereby acting as a biocide.

In specific embodiments, the composition can effectively disinfect or sterilize a substrate. In further specific embodiments, the composition can effectively disinfect or sterilize the surface of a substrate. In additional specific embodiments, the composition can effectively sterilize a substrate. In further specific embodiments, the composition can effectively sterilize the surface of a substrate.

The term "microbe," "microbes" "microorganism," or "micro-organism" refers to a microscopic organism that comprises either a single cell (unicellular), cell clusters, or no cell at all (acellular). Microorganisms are very diverse; they include bacteria, fungi, archaea, and protists; microscopic plants (green algae); and animals such as plankton and the planarian. Some microbiologists also include viruses, but others consider these as non-living. Most microorganisms are unicellular (single-celled), but this is not universal, since some multicellular organisms are microscopic, while some unicellular protists and bacteria, like *Thiomargarita namibiensis*, are macroscopic and visible to the naked eye.

The term "virus" refers to a small infectious agent that can replicate only inside the living cells of organisms. Virus particles (known as virions) consist of two or three parts: the genetic material made from either DNA or RNA, long molecules that carry genetic information; a protein coat that protects these genes; and in some cases an envelope of lipids that surrounds the protein coat when they are outside a cell. The shapes of viruses range from simple helical and icosahedral forms to more complex structures. The average virus is about one one-hundredth the size of the average bacterium. An enormous variety of genomic structures can be seen among viral species; as a group they contain more structural genomic diversity than plants, animals, archaea, or bacteria. There are millions of different types of viruses, although only about 5,000 of them have been described in detail. A virus has either DNA or RNA genes and is called a DNA virus or a RNA virus respectively. The vast majority of viruses have RNA genomes. Plant viruses tend to have single-stranded RNA genomes and bacteriophages tend to have double-stranded DNA genomes.

The term "fungi" or "fungus" refers to a large and diverse group of eucaryotic microorganisms whose cells contain a nucleus, vacuoles, and mitochondria. Fungi include algae, molds, yeasts, mushrooms, and slime molds. See, Biology of Microorganisms, T. Brock and M. Madigan, 6th Ed., 1991, Prentice Hill (Englewood Cliffs, N.J.). Exemplary fungi include Ascomycetes (e.g., *Neurospora, Saccharomyces, Morchella*), Basidiomycetes (e.g., *Amanita, Agaricus*), Zygomycetes (e.g., *Mucor, Rhizopus*), Oomycetes (e.g., *Allomyces*), and Deuteromycetes (e.g., *Penicillium, Aspergillus*).

The term "mold" refers to a filamentous fungus, generally a circular colony that may be cottony, wooly, etc. or glabrous, but with filaments not organized into large fruiting bodies, such as mushrooms. See, e.g., Stedman's Medical Dictionary, 25th Ed., Williams & Wilkins, 1990 (Baltimore, Md.). One exemplary mold is the Basidiomycetes called wood-rotting fungi. Two types of wood-rotting fungi are the white rot and the brown rot. An ecological activity of many fungi, especially members of the Basidiomycetes is the decomposition of wood, paper, cloth, and other products derived from natural sources. Basidiomycetes that attack these products are able to utilize cellulose or lignin as carbon and energy sources. Lignin is a complex polymer in which the building blocks are phenolic compounds. It is an important constituent of woody plants. The decomposition of lignin in nature occurs almost exclusively through the agency of these wood-rotting fungi. Brown rot attacks and decomposes the cellulose and the lignin is left unchanged. White rot attacks and decomposes both cellulose and lignin. See, Biology of Microorganisms, T. Brock and M. Madigan, 6th Ed., 1991, Prentice Hill (Englewood Cliffs, N.J.).

The term "slime molds" refers to nonphototrophic eucaryotic microorganisms that have some similarity to both fungi and protozoa. The slime molds can be divided into two groups, the cellular slime molds, whose vegetative forms are composed of single amoebalike cells, and the acellular slime molds, whose vegetive forms are naked masses of protoplasms of indefinite size and shape called plasmodia. Slime molds live primarily on decaying plant matter, such as wood, paper, and cloth. See, Biology of Microorganisms, T. Brock and M. Madigan, 6th Ed., 1991, Prentice Hill (Englewood Cliffs, N.J.).

The term "algae" refers to a large and diverse assemblage of eucaryotic organisms that contain chlorophyll and carry out oxygenic photosynthesis. See, Biology of Microorganisms, T. Brock and M. Madigan, 6th Ed., 1991, Prentice Hill (Englewood Cliffs, N.J.). Exemplary algae include Green Algae (e.g., *Chlamydomonas*), Euglenids (e.g., *Euglena*), Golden Brown Algae (e.g., *Navicula*), Brown Algae (e.g., *Laminaria*), Dinoflagellates (e.g., *Gonyaulax*), and Red Algae (e.g., *Polisiphonia*).

The term "yeast" refers to unicellular fungi, most of which are classified with the Ascomytes. See, Biology of Microorganisms, T. Brock and M. Madigan, 6th Ed., 1991, Prentice Hill (Englewood Cliffs, N.J.).

The term "mushrooms" refer to filamentous fungi that are typically from large structures called fruiting bodies, the edible part of the mushroom. See, Biology of Microorganisms, T. Brock and M. Madigan, 6th Ed., 1991, Prentice Hill (Englewood Cliffs, N.J.).

The term "bacterium" or "bacteria" refers to a large domain of prokaryotic microorganisms. Typically a few micrometers in length, bacteria have a wide range of shapes, ranging from spheres to rods and spirals. Bacteria are present in most habitats on Earth, growing in soil, acidic hot springs, radioactive waste, water, and deep in the Earth's crust, as well as in organic matter and the live bodies of plants and animals, providing outstanding examples of mutualism in the digestive tracts of humans, termites and cockroaches. There are typically about 40 million bacterial cells in a gram of soil and a million bacterial cells in a milliliter of fresh water; in all, there are approximately five nonillion ($5\times10^{30}$) bacteria on Earth, forming a biomass that exceeds that of all plants and animals. Most bacteria have not been characterized, and only about half of the phyla of bacteria have species that can be grown in the laboratory.

The term "*P. aeruginosa*" or "*Pseudomonas aeruginosa*" refers to a common bacterium that can cause disease in animals, including humans. It is found in soil, water, skin flora, and most man-made environments throughout the world. It thrives not only in normal atmospheres, but also in hypoxic atmospheres, and has, thus, colonized many natural and artificial environments. It uses a wide range of organic material for food; in animals, the versatility enables the organism to infect damaged tissues or those with reduced immunity. The symptoms of such infections are generalized inflammation and sepsis. If such colonizations occur in critical body organs, such as the lungs, the urinary tract, and kidneys, the results can be fatal. Because it thrives on most surfaces, this bacterium is also found on and in medical equipment, including catheters, causing cross-infections in hospitals and clinics. It is implicated in hot-tub rash.

The term "*S. aureus*" or "*Staphylococcus aureus*" refers to a facultative anaerobic Gram-positive bacterium. It is frequently found as part of the normal skin flora on the skin and nasal passages. It is estimated that 20% of the human population are long-term carriers of *S. aureus*. *S. aureus* is the most common species of staphylococci to cause Staph infections. The reasons *S. aureus* is a successful pathogen are a combination host and bacterial immuno-evasive strategies. One of these strategies is the production of carotenoid pigment staphyloxanthin which is responsible for the characteristic golden color of *S. aureus* colonies. This pigment acts as a virulence factor, primarily being a bacterial antioxidant which helps the microbe evade the host's immune system in the form of reactive oxygen species which the host uses to kill pathogens.

*S. aureus* can cause a range of illnesses from minor skin infections, such as pimples, impetigo, boils (furuncles), cellulitis folliculitis, carbuncles, scalded skin syndrome, and abscesses, to life-threatening diseases such as pneumonia, meningitis, osteomyelitis, endocarditis, toxic shock syndrome (TSS), bacteremia, and sepsis. Its incidence is from skin, soft tissue, respiratory, bone, joint, endovascular to wound infections. It is still one of the five most common causes of nosocomial infections, often causing postsurgical wound infections. Each year, some 500,000 patients in American hospitals contract a staphylococcal infection.

Methicillin-resistant *S. aureus*, abbreviated MRSA and often pronounced "mer-sa" (in North America), is one of a number of greatly-feared strains of *S. aureus* which have become resistant to most antibiotics. MRSA strains are most often found associated with institutions such as hospitals, but are becoming increasingly prevalent in community-acquired infections.

The term "*E. hirae*" or "*Enterococcus* hirae" refers to a species of *Enterococcus*.

The term "*M. terrae*" or "*Mycobacterium terrae*" refers to a slow-growing species of *Mycobacterium*. It is an ungrouped member of the third Runyon (nonchromatogenic mycobacteria). It is known to cause serious skin infections, which are relatively resistant to antibiotic therapy The term "*Mycobacterium avium* complex," "*M. avium* complex" or "MAC" refers to a group of genetically related bacteria belonging to the genus *Mycobacterium*. It includes *Mycobacterium avium* and *Mycobacterium intracellulare*.

The term "*M. avium*" or "*Mycobacterium avium*" refers to a species of *Mycobacterium*.

The term "*M. intracellulare*" or "*mycobacterium intracellulare*" refers to a species of *Mycobacterium*.

The invention will now be described by the following non-limiting examples.

The following paragraphs enumerated consecutively from 1 through 106 provide for various aspects of the present invention. In one embodiment, in a first paragraph (1), the present embodiments pertain to a method to stabilize a peracetic acid and hydrogen peroxide solution comprising the step:

contacting a peracetic acid and hydrogen peroxide solution with a polymeric resin functionalized with phosphonic acid to provide a treated peracetic acid and hydrogen peroxide solution.

2. The method according to paragraph 1, wherein the peracetic acid and hydrogen peroxide solution is eluted through a bed of the polymeric resin functionalized with the phosphonic acid to provide the treated peracetic acid and hydrogen peroxide solution.

3. The method according to paragraph 1, wherein the peracetic acid and hydrogen peroxide solution is contacted with an interior portion of a container wall that includes the polymeric resin functionalized with the phosphonic acid.

4. The method according to paragraph 3, wherein the interior portion of the container wall incorporates the polymeric resin functionalized with phosphonic acid via a coating, or is extruded into the material comprising container wall or is embedded into the container wall.

5. The method according to either paragraph 3 or 4, wherein the container comprises a material that is a polypropylene, a polyethylene, a polypropylene and polyethylene copolymer or a polyethylene and polypropylene blend.

6. The method according to any of paragraphs 1 through 5, wherein the polymeric resin functionalized with the phosphonic acid is a polymerized resin of vinylidene diphosphonic acid or a copolymer of vinylidene diphosphonic acid.

7. The method according to any of paragraphs 1 through 6, wherein the polymeric resin functionalized with the phosphonic acid is crosslinked.

8. The method according to any of paragraphs 1 through 7, wherein the treated peracetic acid and hydrogen peroxide solution is stable at ambient conditions for at least 180 days, 365 days or 545 days.

9. The method according to paragraph 8, wherein the treated peracetic acid and hydrogen peroxide solution retains at least a 60% concentration of the original concentration of the peracetic acid after at least 180 days, 365 days or 545 days.

10. The method according to paragraph 9, wherein the treated peracetic acid and hydrogen peroxide solution retains at least 80% concentration of the original concentration of the peracetic acid after at least 180 days, 365 days or 545 days.

11. The method according to paragraph 8, wherein the treated peracetic acid and hydrogen peroxide solution retains at least 80% concentration of the original concentration of hydrogen peroxide after at least 180 days, 365 days or 545 days.

12. The method according to paragraph 11, wherein the treated peracetic acid and hydrogen peroxide solution retains at least 90% concentration of the original concentration of hydrogen peroxide after at least 180 days, 365 days or 545 days.

13. A container comprising:
a container wall having an interior surface and an exterior surface, the container wall defining an interstitial space, wherein the container is sealable, wherein the container material that forms the container wall comprises a polymeric resin functionalized with phosphonic acid or 1-hydroxyethylidene-1,1,-diphosphonic acid associated with the interior surface of the container.

14. The container according to paragraph 13, wherein the polymeric resin functionalized with the phosphonic acid is coated onto the interior surface of the container.

15. The container according to paragraph 13, wherein the polymeric resin functionalized with the phosphonic acid is embedded into the interior surface of the container.

16. The container according to paragraph 13, wherein the polymer resin functionalized with the phosphonic acid is extruded into the material that forms the container wall.

17. The container according to any of paragraphs 13 through 16, wherein the container material is a polypropylene, a polyethylene, a polypropylene and polyethylene copolymer or a polyethylene and polypropylene blend.

18. The container according to any of paragraphs 13 through 17, wherein the polymeric resin functionalized with the phosphonic acid is a vinylidene diphosphonic acid or a copolymer of vinylidene diphosphonic acid.

19. The container according to any of paragraphs 13 through 18, wherein the polymeric resin functionalized with the phosphonic acid is crosslinked.

20. The container of according to any of paragraphs 13 through 19, further comprising an outer coating or layer applied to the exterior portion of the container.

21. A packaged solution comprising:
a peracetic acid and hydrogen peroxide solution treated with a polymeric resin functionalized with phosphonic acid to provide a treated peracetic acid and hydrogen peroxide solution; and
a container, wherein the treated peracetic acetic acid and hydrogen peroxide solution is contained.

22. The packaged solution according to paragraph 21, wherein the peracetic acid and hydrogen peroxide solution is eluted through a bed of the polymeric resin functionalized with the phosphonic acid.

23. The packaged solution according to paragraph 21, wherein the peracetic acid and hydrogen peroxide solution is contacted with an interior surface of a container wall that includes the polymeric resin functionalized with the phosphonic acid or 1-hydroxyethylidene-1,1,-diphosphonic acid.

24. The packaged solution according to paragraph 23, wherein the interior surface of the container wall incorporates the polymeric resin functionalized with phosphonic acid or 1-hydroxyethylidene-1,1,-diphosphonic acid via a coating, or is extruded into the material comprising container wall or is embedded into the container wall.

25. The packaged solution according to either paragraph 23 or 24, wherein the container material is a polypropylene, a polyethylene, a polypropylene and polyethylene copolymer or a polyethylene and polypropylene blend.

26. The packaged solution according to any of paragraphs 21 through 25, wherein the polymeric resin functionalized with the phosphonic acid is vinylidene diphosphonic acid or a copolymer of vinylidene diphosphonic acid.

27. The packaged solution according to any of paragraphs 21 through 26, wherein the polymeric resin functionalized with the phosphonic acid is crosslinked.

28. The packaged solution according to any of paragraphs 21 through 27, wherein the treated peracetic acid and hydrogen peroxide solution is stable at ambient conditions for at least 18 months.

29. The packaged solution according to paragraph 28, wherein the treated peracetic acid and hydrogen peroxide solution retains at least a 60% concentration of the original concentration of the peracetic acid at least 180 days, 365 days or 545 days.

30. The packaged solution according to paragraph 29, wherein the treated peracetic acid and hydrogen peroxide solution retains at least 80% concentration of the original concentration of the peracetic acid at least 180 days, 365 days or 545 days.

31. The packaged solution according to paragraph 28, wherein the treated peracetic acid and hydrogen peroxide solution retains at least 80% concentration of the original concentration of hydrogen peroxide at least 180 days, 365 days or 545 days.

32. The packaged solution according to paragraph 31, wherein the treated peracetic acid and hydrogen peroxide solution retains at least 90% concentration of the original concentration of hydrogen peroxide at least 180 days, 365 days or 545 days.

33. A composition comprising:
hydrogen peroxide;
an organic acid;
a polymeric phosphonic acid resin chelator; and
optionally, a surfactant.

34. The composition according to paragraph 33, wherein the composition comprises less than about 1 wt. % of an anticorrosive agent.

35. The composition according to paragraphs 33 or 34, wherein upon application of the composition to a surface, a residue is not deposited upon the treated surface.

36. The composition according to any of paragraphs 33 through 35, wherein the organic acid is peracetic acid.

37. The composition according to paragraph 36, wherein the peracetic acid is formed by the reaction of acetic acid with hydrogen peroxide.

38. The composition according to either of paragraphs 36 or 37, wherein peracetic acid is present in about 1 wt. % to about 15 wt. % of the composition.

39. The composition according to any of paragraphs 36 through 38, wherein the peracetic acid is present in about 3 wt. % to about 10 wt. % of the composition.

40. The composition according to any of paragraphs 36 through 39, wherein peracetic acid is present in about 5 wt. % to about 7.5 wt. % of the composition.

41. The composition according to any of paragraphs 33 through 40, wherein the composition is a liquid disinfectant or sterilant.

42. The composition according to any of paragraphs 33 through 41, wherein the composition does not include an anticorrosive agent.

43. The composition according to any of paragraphs 33 through 42, wherein the composition is non-toxic.

44. The composition according to any of paragraphs 33 through 43, wherein the composition has a long-term stability such that at about 1 atm and about 19° C., less than about 25 wt. % of each component independently degrades over about a year.

45. The composition according to any of paragraphs 33 through 44, wherein the composition has a long-term stability such that at about 1 atm and about 19° C., at least about 75 wt. % of each component is independently present after about one year.

46. The composition according to any of paragraphs 33 through 45, wherein the composition is essentially free of buffer.

47. The composition according to any of paragraphs 33 through 46, wherein the composition comprises less than about 0.1 wt. % buffer.

48. The composition according to any of paragraphs 33 through 47, wherein the hydrogen peroxide is present in about 10 wt. % to about 50 wt. % of the composition.

49. The composition according to any of paragraphs 33 through 48, wherein the hydrogen peroxide is present in at least about 15 wt. % of the composition.

50. The composition according to any of paragraphs 33 through 49, wherein the hydrogen peroxide is present in about 18 wt. % to about 32 wt. % of the composition.

51. The composition according to any of paragraphs 33 through 50, wherein the hydrogen peroxide is present in about 18 wt. % to about 32 wt. % of the composition.

52. The composition according to any of paragraphs 33 through 51, wherein the hydrogen peroxide is present in about 20 wt. % to about 26 wt. % of the composition.

53. The composition according to any of paragraphs 33 through 52, wherein the hydrogen peroxide is present in about 28 wt. % of the composition.

54. The composition according to any of paragraphs 33 through 53, wherein the organic acid comprises acetic acid.

55. The composition according to any of paragraphs 33 through 54, wherein the organic acid comprises glacial acetic acid.

56. The composition according to any of paragraphs 33 through 55, wherein the organic acid comprises acetic acid, present in at least about 3 wt. % of the composition.

57. The composition according to any of paragraphs 33 through 56, wherein the organic acid comprises acetic acid, present in about 3 wt. % to 65 wt. % of the composition.

58. The composition according to any of paragraphs 33 through 57, wherein the organic acid comprises acetic acid, present in about 7 wt. % to about 14 wt. % of the composition.

59. The composition according to any of paragraphs 33 through 58, wherein the organic acid comprises acetic acid, present in about 9 wt. % to about 11 wt. % of the composition.

60. The composition according to any of paragraphs 33 through 59, wherein the organic acid comprises acetic acid, present in about 10 wt. % to about 22 wt. % of the composition.

61. The composition according to any of paragraphs 33 through 60, wherein the organic acid comprises acetic acid, present in about 16 wt. % of the composition.

62. The composition according to any of paragraphs 33 through 61, wherein the polymeric phosphonic acid resin chelator effectively chelates transition metals.

63. The composition according to any of paragraphs 33 through 62, wherein the polymeric phosphonic resin chelator comprises a diphosphonic acid functionalized polymer.

64. The composition according to any of paragraphs 33 through 62, wherein the polymeric resin chelator comprising a polymeric resin functionalized with the phosphonic acid is a vinylidene diphosphonic acid or a copolymer of vinylidene diphosphonic acid.

65. The composition according to any of paragraphs 33 through 64, wherein the polymeric resin chelator is present in about 0.1 wt. % to about 10 wt. %, e.g., 0.1 wt. % to about 5 wt. %.

66. The composition according to any of paragraphs 33 through 65, wherein the polymeric resin chelator is present in about 0.2 wt. % to about 2 wt. %.

67. The composition according to any of paragraphs 33 through 66, wherein the polymeric resin chelator is present in about 0.5 wt. % to about 1.5 wt. %.

68. The composition according to any of paragraphs 33 through 67, wherein the surfactant comprises a non-ionic surfactant.

69. The composition according to any of paragraphs 33 through 68, wherein the surfactant comprises at least one of an anionic and cationic surfactant.

70. The composition according to any of paragraphs 33 through 69, wherein the anionic surfactant comprises a polyoxypropylene-polyoxyethylene block copolymer.

71. The composition according to paragraph 70, wherein the polyoxypropylene-polyoxyethylene block copolymer comprises at least about 0.1 wt. % of the composition.

72. The composition according to paragraphs 70 or 71, wherein the polyoxypropylene-polyoxyethylene block copolymer is present in about 0.1 wt. % to about 8 wt. % of the composition.

73. The composition according to any of paragraphs 70 through 72, wherein the polyoxypropylene-polyoxyethylene block copolymer is present in about 1 wt. % to about 3 wt. % of the composition.

74. The composition according to any of paragraphs 70 through 73, wherein the polyoxypropylene-polyoxyethylene block copolymer is present in about 2 wt. % of the composition.

75. The composition according to any of paragraphs 33 through 74, wherein the hydrogen peroxide is present in a concentration of about 0.5 wt. % to about 30 wt. % wt. %; the organic acid is acetic acid, present in a concentration of about 1 wt. % to about 25 wt. %; the polymeric resin chelator is a phosphonic acid functionalized polymer, present in a concentration of about 0.1 wt. % to about 5 wt. %; and the surfactant, if present, is a polyoxypropylene-polyoxyethylene block copolymer, present in a concentration of about 1 wt. % to about 2.0 wt. %; wherein the composition further comprises about 50 wt. % deionized water.

76. The composition according to any of paragraphs 33 through 74, wherein the hydrogen peroxide is present in a concentration of about 20-26 wt. %; the organic acid is acetic acid, present in a concentration of about 9.0 to 11.0 wt. %; the polymeric resin chelator is a phosphonic acid functionalized polymer present in a concentration of about 0.1 wt. % to about 5 wt. %; and the surfactant is a polyoxypropylene-polyoxyethylene block copolymer, if present, in a concentration of about 1 wt. % to about 2.0 wt. %; wherein the composition further comprises about 50 wt. % deionized water; and wherein the composition further comprises about 6 wt. % to 8 wt. % peracetic acetic acid.

77. The composition according to any of paragraphs 33 through 76, wherein the balance of the composition is water.

78. The composition according to any of paragraphs 33 through 77, wherein the balance of the composition is deionized water.

79. The composition according to any of paragraphs 33 through 78, which is a liquid concentrate disinfectant or sterilant.

80. The composition according to any of paragraphs 33 through 74, formulated for use in a sprayable composition.

81. The composition according to any of paragraphs 33 through 80, formulated for use in contacting a surface of at least one of a hospital, physician's office, medical clinic, medical facility, dental office, dental facility, airport, school, pet store, zoo, children's day care, elderly nursing home, museum, movie theatre, athletic facility, sporting arena, gymnasium, rest room, bathroom, shopping center, amusement park, church, synagogue, mosque, temple, restaurant, food processing facility, food manufacturing facility, pharmaceutical company, hot-tub, sauna, and clean room.

82. The composition according to any of paragraphs 33 through 80, formulated for use in contacting at least one of metal, plastic, natural rubber, synthetic rubber, glass, stone, grout, fiberglass, wood, concrete, construction product, and building product.

83. The composition according to any of paragraphs 33 through 80, formulated for use in contacting at least one of medical equipment, medical device, surface in the medical industry, dental equipment, dental device, and surface in the dental industry.

84. The composition according to any of paragraphs 33 through 78, comprising a one part, liquid concentrate disinfectant or sterilant, wherein: the hydrogen peroxide concentration is about 20.0 wt. % to about 26.0 wt. %; the acetic acid concentration is about 9.0 wt. % to about 11.0 wt. %; the polymeric resin chelator is a phosphonic acid functionalized polymer present in a concentration of about 0.1 wt. % to about 5 wt. %; and the surfactant is a polyoxypropylene-polyoxyethylene block copolymer, present in a concentration of about 1 wt. % to about 2.0 wt. %; and the peracetic acid concentration is about 6.0 to about 8 wt. %.

85. A kit comprising: an enclosed container comprising a removable closure, the composition of any of paragraphs 33 through 84, located inside an enclosed container, and printed indicia located on the enclosed container.

86. The kit according to paragraph 85, wherein the enclosed container is manufactured from high density polyethylene (HDPE).

87. The kit according to paragraphs 85 or 86, wherein the enclosed container is opaque.

88. The kit according to any of the paragraphs 85 through 87, wherein the printed indicia comprises instructions to avoid excessive heat, to avoid elevated temperatures, to avoid direct sunlight, or combinations thereof.

89. The kit according to any of the paragraphs 85 through 88, wherein the enclosed container further comprises a head space.

90. The kit according to any of the paragraphs 85 through 89, wherein the enclosed container further comprises a head space, wherein the head space comprises oxygen ($O_2$), peracetic acid vapor and/or acetic acid vapor.

91. The kit according to any of the paragraphs 85 through 90, wherein the enclosed container further comprises a head space, present in up to about 1% to about 25% (v/v) of the enclosed container.

92. The kit according to any of the paragraphs 85 through 91, wherein a removable closure of the enclosed container comprises a pressure valve, configured to release excessive gas from within the enclosed container.

93. The kit according to any of the paragraphs 85 through 92, further comprising a liquid applicator comprising at least one of a spray bottle, wipe, cloth, sponge, non-woven fabric, and woven fabric.

94. A method for reducing the number of microbes located upon a substrate, the method comprising the step of contacting the substrate with an effective amount of the composition of any one of paragraphs 33 through 80, for a sufficient period of time, effective to reduce the number of microbes located upon the substrate.

95. The method according to paragraph 94, wherein the microbe or microorganism includes at least one of a virus, fungus, mold, slime mold, algae, yeast, mushroom and bacterium.

96. The method according to paragraph 94 or 95, wherein up to about 4 logs of the microbe or microorganism is inactivated in about 30 minutes or less (e.g., 15 minutes, 10 minutes, 5 minutes, 3 minutes or 1 minute) or up to about 12 logs of the microbe or microorganism is inactivated in about 60 minutes or less (e.g., 30 minutes, 15, minutes, 10 minutes, 5 minutes, 3 minutes or 1 minute).

97. A method of killing or inhibiting a microorganism, the method comprising the step of contacting the microorganism with an antimicrobially effective amount of the composition of any of paragraphs 33 through 80, for a sufficient period of time, effective to kill or inhibit the microorganism.

98. A method of disinfecting or sterilizing a substrate, the method comprising the step of contacting the substrate with an effective amount of the composition of any of paragraphs 33 through 80, for a sufficient period of time, effective to disinfect or sterilize the substrate.

99. The method of any of paragraphs 94 through 98, wherein the substrate to be contacted is a medical device.

100. The method of any of paragraphs 94 through 98, wherein the substrate to be contacted is a soiled endoscopic device.

101. The method of any of paragraphs 94 through 98, wherein the substrate to be contacted is cleaned prior to disinfecting or sterilizing.

102. The method of any of paragraphs 94 through 98, wherein the substrate to be contacted is a medical device, wherein the medical device is cleaned to remove foreign and fecal matter prior to disinfecting or sterilizing.

103. The method of any of paragraphs 94 through 98, wherein the substrate to be contacted is an endoscopic device, wherein the endoscopic device is cleaned to remove foreign and fecal matter prior to disinfecting or sterilizing.

104. The method of any of paragraphs 94 through 98, wherein the substrate to be contacted is a cleaned medical device.

105. The method of any of paragraphs 94 through 98, wherein the substrate to be contacted is a cleaned endoscopic device.

106. A container comprising:
a container wall having an interior surface and an exterior surface, the container wall defining an interstitial space, wherein the container is sealable, wherein the interior surface of the container is coated with vinylidene diphosphonic acid or vinyl phosphonic acid and polymerized to coat the interior surface with a polyvinyldiphosphonic acid or a polyvinyl phosphonic acid.

Although the present invention has been described with reference to preferred embodiments, persons skilled in the art will recognize that changes may be made in form and detail without departing from the spirit and scope of the invention. All references cited throughout the specification, including those in the background, are incorporated herein in their entirety. Those skilled in the art will recognize, or be able to ascertain, using no more than routine experimentation, many equivalents to specific embodiments of the invention described specifically herein. Such equivalents are intended to be encompassed in the scope of the following claims.

What is claimed is:

1. A method to stabilize a peracetic acid and hydrogen peroxide solution comprising the step:
contacting a peracetic acid and hydrogen peroxide solution with a polymeric resin functionalized with phosphonic acid to provide a treated peracetic acid and hydrogen peroxide solution, wherein the polymeric resin functionalized with the phosphonic acid is a polymerized resin of vinylidene diphosphonic acid or a copolymer of vinylidene diphosphonic acid.

2. The method according to claim 1, wherein the peracetic acid and hydrogen peroxide solution is eluted through a bed of the polymeric resin functionalized with the phosphonic acid to provide the treated peracetic acid and hydrogen peroxide solution.

3. The method according to claim 1, wherein the peracetic acid and hydrogen peroxide solution is contacted with an interior portion of a container wall that includes the polymeric resin functionalized with the phosphonic acid.

4. The method according to claim 3, wherein the interior portion of the container wall incorporates the polymeric resin functionalized with phosphonic acid via a coating, or is extruded into the material comprising container wall or is embedded into the container wall.

5. The method according to claim 3, wherein the container comprises a material that is a polypropylene, a polyethylene, a polypropylene and polyethylene copolymer or a polyethylene and polypropylene blend.

6. The method according to claim 1, wherein the polymeric resin functionalized with the phosphonic acid is crosslinked.

7. The method according to claim 1, wherein the treated peracetic acid and hydrogen peroxide solution is stable at ambient conditions for at least 180 days, 365 days or 545 days.

8. The method according to claim 7, wherein the treated peracetic acid and hydrogen peroxide solution retains at least a 60% concentration of the original concentration of the peracetic acid after at least 180 days, 365 days or 545 days.

9. The method according to claim 8, wherein the treated peracetic acid and hydrogen peroxide solution retains at least 80% concentration of the original concentration of the peracetic acid after at least 180 days, 365 days or 545 days.

10. The method according to claim 7, wherein the treated peracetic acid and hydrogen peroxide solution retains at least 80% concentration of the original concentration of hydrogen peroxide after at least 180 days, 365 days or 545 days.

11. The method according to claim 10, wherein the treated peracetic acid and hydrogen peroxide solution retains at least 90% concentration of the original concentration of hydrogen peroxide after at least 180 days, 365 days or 545 days.

12. A packaged solution comprising:
a peracetic acid and hydrogen peroxide solution treated with a polymeric resin functionalized with phosphonic acid to provide a treated peracetic acid and hydrogen peroxide solution, wherein the polymeric resin functionalized with the phosphonic acid is vinylidene diphosphonic acid or a copolymer of vinylidene diphosphonic acid; and
a container, wherein the treated peracetic acetic acid and hydrogen peroxide solution is contained.

13. The packaged solution according to claim 12, wherein the peracetic acid and hydrogen peroxide solution is eluted through a bed of the polymeric resin functionalized with the phosphonic acid.

14. The packaged solution according to claim 12, wherein the peracetic acid and hydrogen peroxide solution is contacted with an interior surface of a container wall that includes the polymeric resin functionalized with the phosphonic acid or 1-hydroxyethylidene-1,1,-diphosphonic acid.

15. The packaged solution according to claim 14, wherein the interior surface of the container wall incorporates the polymeric resin functionalized with phosphonic acid or 1-hydroxyethylidene-1,1,-diphosphonic acid via a coating, or is extruded into the material comprising container wall or is embedded into the container wall.

16. The packaged solution according to claim 14, wherein the container material is a polypropylene, a polyethylene, a polypropylene and polyethylene copolymer or a polyethylene and polypropylene blend.

17. The packaged solution according to claim 12, wherein the polymeric resin functionalized with the phosphonic acid is crosslinked.

18. The packaged solution according to claim 12, wherein the treated peracetic acid and hydrogen peroxide solution is stable at ambient conditions for at least 18 months.

19. A packaged solution comprising:
a peracetic acid and hydrogen peroxide solution treated with a polymeric resin functionalized with phosphonic acid to provide a treated peracetic acid and hydrogen peroxide solution; and
a container, wherein the treated peracetic acetic acid and hydrogen peroxide solution is contained, wherein the treated peracetic acid and hydrogen peroxide solution is stable at ambient conditions for at least 18 months and retains at least a 60% concentration of the original concentration of the peracetic acid at least 180 days, 365 days or 545 days.

20. The packaged solution according to claim 19, wherein the treated peracetic acid and hydrogen peroxide solution retains at least 80% concentration of the original concentration of the peracetic acid at least 180 days, 365 days or 545 days.

21. The packaged solution according to claim 18, wherein the treated peracetic acid and hydrogen peroxide solution retains at least 80% concentration of the original concentration of hydrogen peroxide at least 180 days, 365 days or 545 days.

22. The packaged solution according to claim 21, wherein the treated peracetic acid and hydrogen peroxide solution retains at least 90% concentration of the original concentration of hydrogen peroxide at least 180 days, 365 days or 545 days.

* * * * *